UNITED STATES PATENT OFFICE.

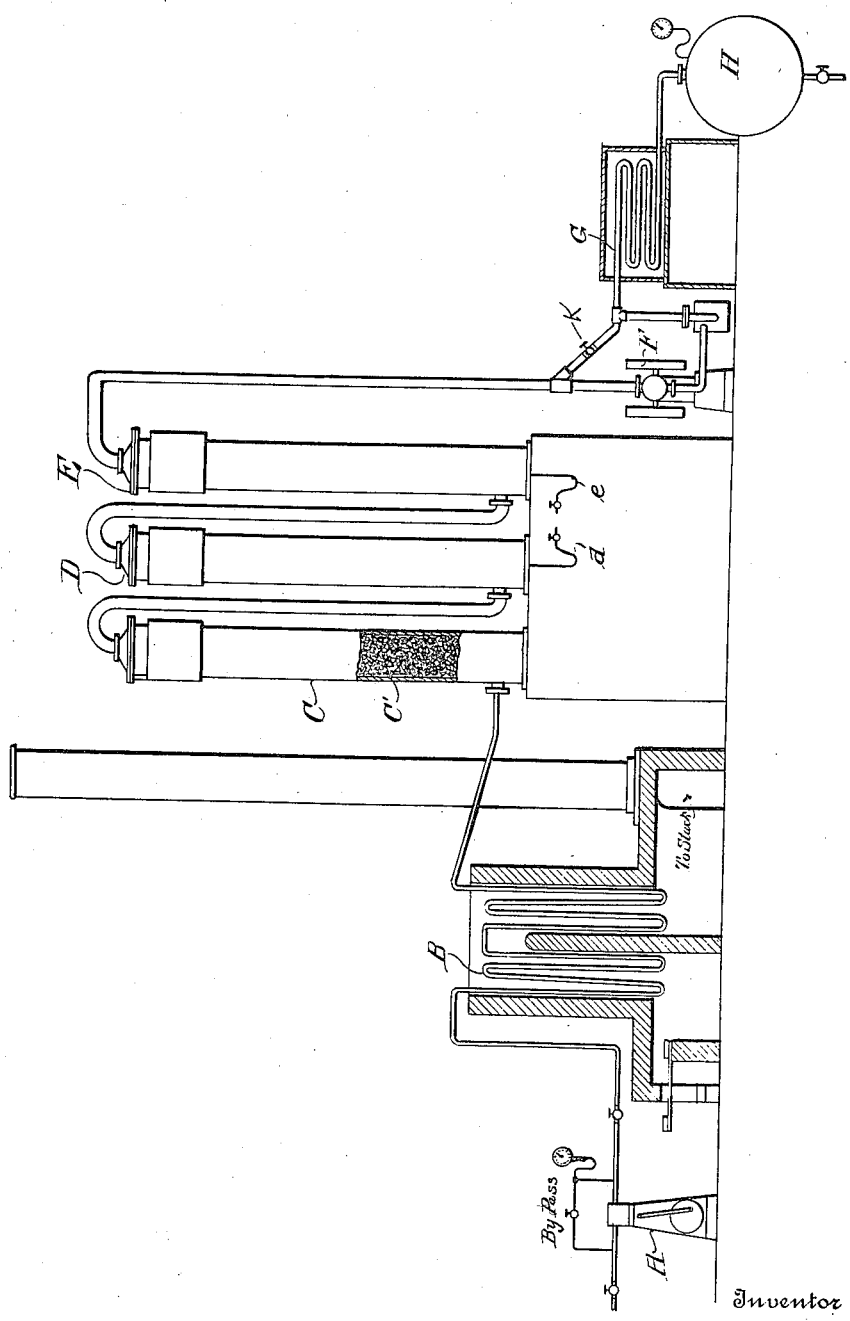

WILLIAM AUGUSTUS HALL, OF NEW YORK, N. Y.

PROCESS OF CRACKING HYDROCARBONS.

1,194,289.  Specification of Letters Patent.  Patented Aug. 8, 1916.

Application filed March 21, 1916. Serial No. 85,735.

*To all whom it may concern:*

Be it known that I, WILLIAM A. HALL, a citizen of the United States, residing at New York, in the county of New York and State of New York, have invented certain new and useful Improvements in Processes of Cracking Hydrocarbons, of which the following is a specification.

This invention relates to the cracking of oils for their subsequent conversion into motor spirit or into members of the aromatic series such as benzene, toluene and xylene, and has for its object to provide an improved process of cracking such oils to obtain a more uniform cracking of the oil than was hitherto possible, and with the consequent production of less permanent gas and a consequent saving in fuel.

Broadly, the improved process of cracking consists in subjecting the oil to a partial cracking by forcing it under pressure at a high speed of flow through small tubes heated to a sufficiently high temperature to produce this partial cracking, the oil being vaporized to such an extent that the speed of flow of the vapors and gases through the tubes is increased very largely, and then, preferably while they are no longer subjected to such external heating, suddenly reducing the velocity of such vapors and gases very largely thereby transforming substantially all of the energy in the form of velocity, save the initial velocity, into additional heat of a superheating character which completes the cracking operation without converting the vapors into permanent gas.

In carrying the invention into effect I pass the oil at a high speed of flow through small tubes of approximately one inch diameter under a pressure of approximately 75 lbs. (or more) per square inch and at a temperature of the vapors inside the pipe of from 550° C. to say 700° C. depending upon the product to be obtained and the oil treated, the oil being vaporized in the tubing to such an extent that the speed of the vapors becomes from 5000 feet per minute upward, the amount of feed being so large and the temperature so low that only a partial cracking into gasolene-like material is effected in these tubes, the great speed of flow and incomplete cracking preventing any material deposit of carbonaceous matter in the tubes. The gases and vapors are then expanded into a much larger tube, say of from 12″ to 16″ in diameter (and which may be 8 to 11 feet in height) in one or more stages, being preferably caused to impinge against suitable baffles or filling in order to suddenly reduce the velocity to an enormous extent, thereby transforming the mechanical energy of the gases and vapors in the form of velocity into additional heat, the temperature of the vapors and gases in the large tube being thereby raised without any extraneous heat being applied, the cracking operation being thus completed in this large tube. As the walls of this large tube are cooler than the center of the mass of vapors passing into the same not much decomposition of the vapors into permanent gas takes place in this large tube.

The product of the cracking operation if it is to be converted into motor spirit may be treated for intsance as described in my U. S. Patent No. 1,175,910. In said patent, as well as in applications for Letters Patent Serial Nos. 824,194, 829,634 I have claimed the production of motor fuel by steps described in the present application. In converting the product of the cracking operation into hydrocarbons of the aromatic series a compressor such as that shown in the accompanying drawing is not necessary. Compression without the compressor is created in the tubes of the converter by the expansion of the gases and such compression is fully as high as the pressure created subsequently by the compressor. In producing motor spirit such compressor is required as without it there is not obtained in the final product a sufficient amount of low boiling fractions. In treating the oil for the purpose of conversion into members of the aromatic series, the oil in the tube constituting the decomposing retort or "converter" is subjected to a higher temperature than in the production of motor fuel, say a temperature of about 650° C. to 700° C. and a correspondingly higher pressure is produced. This temperature of course depends to some extent on the character of the oil treated, easily cracking oils such as those of Mexico, California and Persia requiring lower temperatures to obtain the same results than the more difficultly cracking oils like Pennsylvania kerosene. It will be clear that in operating at the high temperatures there will be no need for a throttle valve such as that beyond the converter in the said prior patent since the necessary pressure of 75 lbs. and above is obtained entirely from the amount of oil fed in and the expansion of the vapors. I find that when running at say about 700° C. and feeding the oil at the rate of 90 gallons per hour through a 1" pipe, the expansion is so great that I obtain the desired pressure without any throttling.

Naturally in practising the process for the conversion into aromatics there is produced much more fixed gas than is produced when the process is operated for the production of motor spirit, on account of the higher temperature used in the production of aromatics. The product produced does not consist entirely of members of the aromatic series, and subsequent distillation to separate the benzene, toluene and xylene from the paraffins (or other treatment to secure this result) is necessary.

By only partially cracking the oil in the heated tubes and by producing a rise in temperature and effecting as large an amount of the cracking as possible beyond the influence of external heat, the production of large amounts of fixed gas, (which are of course of a less value than the condensable spirit) is largely prevented. If the cracking were all done in the heated tubes (on the same total yield of spirit), the permanent gas produced would be much greater than is produced when a considerable amount of, (and the completion of) the cracking is effected at a point beyond the influence of the external heat. The light vapors never being exposed to a higher temperature than that of their production are not decomposed into fixed gas by superheating, and are collected as a condensate along with the other condensable portions, thereby greatly increasing the yield of spirit, this increase practically all being in the very low boiling fractions (lighter fractions).

It will be seen that the mechanical energy in the form of velocity of the gases is largely converted into heat which superheats the whole in a somewhat similar manner to that in which steam is superheated in a throttling calorimeter.

Apparatus suitable for performing the process is illustrated somewhat diagrammatically in the accompanying drawings in elevation, partly in vertical section.

In the drawing, A denotes a pump which is operated at a speed suitable for forcing the oil to be treated at a high rate of flow into a converter B heated in the same manner as in my patent above noted, to a temperature suited to produce partial cracking of the oil and under a pressure of 50 to 75 lbs. (or more) per square inch. The vapors and gases produced in the converter B, by reason partly of the expansion produced, pass at a very high speed into a very much larger vertical pipe or column C where the pressure falls to 1 or 2 lbs. per square inch, this column being provided with baffles or suitable filling material for reducing the velocity of the vapors and gases suddenly to a very large extent. This velocity is thereby converted into additional heat which superheats the vapors and gases and thereby completes the cracking operation. The vapors and gases are then led through dephlegmators D and E from which the heavy and light residues are removed by way of pipes $d$ and $e$ and thence (in the production of motor fuel) to a compressor F and compressed for example to about 125 pounds per square inch, and pass under about this pressure, into a condenser G from which they are taken to a receiving tank H. In the production of aromatics, the vapors and gases from E pass directly to the condenser G, through the valved pipe K.

What I claim is:—

1. A process of cracking an oil consisting largely of fractions having higher boiling points than ordinary gasolene, which comprises passing said oil at a rate of flow sufficient to prevent deposition of any material amount of free carbon, through a pipe under a pressure materially above atmospheric, while at a temperature sufficient to vaporize the said oil and to only partially crack the same into products having a boiling point range suitable for use directly as gasolene, then suddenly introducing the products of the partial cracking step while discontinuing the external heating, into a separate receptacle and against obstructions therein, under conditions capable of converting a material proportion of the energy of velocity into heat, and thereby developing, within the gases and vapors, a sufficient amount of heat to effect a further cracking of the said vapors.

2. In the process of cracking oils, the step of suddenly converting into heat, a portion of the energy represented by the velocity of a rapidly flowing mixture of gases and vapors of cracked hydrocarbons, a part only of which have a suitable boiling point range for use directly as gasolene, by directing said rapidly flowing mixture against obstructions, whereby the temperature is raised and a further cracking is effected.

3. In the cracking of oil, the step of passing the hydrocarbon oil rapidly through a coil at an elevated temperature and under a superatmospheric pressure suitable to produce some cracking and to leave a mixture consisting essentially of vapors and gases, and then raising the temperature of the said vapors and gases sufficiently to further crack the said vapors, while avoiding the application of external heat during said second heating step.

4. A process of cracking oil for the production of motor fuel or of products containing members of the aromatic series, such as benzene, toluene, xylene, which comprises the successive steps of forcing the oil at a high rate of flow through tubes heated to a temperature below the desired cracking temperature and under a pressure materially above atmospheric, but low enough to permit vaporization of the bulk of the oil, and thereafter directing the rapidly flowing current of vapors and gases against obstructions, while suddenly reducing the velocity of the vapors and gases, and thereby raising the temperature thereof by heat generated therein, substantially as and for the purpose described.

5. A process of cracking oil which comprises forcing the oil at a high rate of flow, under pressure materially above atmospheric through a tubular retort heated to a temperature sufficient to produce a mixture of vapors and gases containing some cracked hydrocarbons of a lower boiling point range than the original oil employed, and suddenly directing the rapidly flowing mixture of vapors and gases against obstructions while reducing the velocity of the vapors and gases produced and thereby raising the temperature thereof, to produce the desired amount of cracking.

6. A process of cracking oil which includes the step of first effecting a partial cracking by subjecting the vapors of said oil, while flowing at a high rate of speed under a pressure of several atmospheres, through a decomposing retort heated to a temperature below that necessary for producing the completion of the desired cracking operation, and then further raising the temperature of said vapors, without the application of any external heat, by converting into heat, a portion of the energy represented by the velocity of the vapors and gases, whereby the completion of the desired cracking operation is effected.

7. A process of cracking oils for the production of motor spirit or of members of the aromatic series such as benzene, toluene and xylene consisting in forcing the oil through a pipe under a pressure of not materially less than about 75 lbs. per square inch at a temperature inside the pipe of from 550° C. to about 700° C. to produce a velocity of vapors of not less than about 5000 feet per minute, and expanding the vapors and gases into a much larger pipe, containing obstructions.

8. A process of cracking oils for the production of motor spirit or of members of the aromatic series such as benzene, toluene and xylene consisting in forcing the oil through a pipe under a pressure of not materially less than about 75 lbs. per square inch at a temperature inside the pipe of from 550° C. to about 700° C. to produce a velocity of vapors of not less than about 5000 feet per minute, and thereafter further heating the said vapors by directing the same against obstructions and quickly reducing the speed of flow thereof.

9. A process of cracking oil consisting essentially of fractions which have higher boiling points than ordinary gasolene, which comprises passing said oil at a rate of flow sufficient to prevent deposition of material amounts of free carbon, through a pipe under a pressure materially above atmospheric, but sufficiently low to allow vaporization of said oil, while at a temperature sufficient to only partially crack said oil into products having a boiling point range suitable for use as gasolene, then suddenly introducing the products of said partial cracking step, while discontinuing external heating, into a separate receptacle, and against obstructions therein, and raising the temperature of the gases and vapors by heat developed by the impingement of the said gases and vapors against said obstructions, to effect a further cracking of the said vapors.

10. The process of converting hydrocarbon oils which comprises subjecting a rapidly flowing current of oil vapor, while under a pressure materially above atmospheric, to a temperature sufficient to only partially crack the same into products having the boiling point range of ordinary gasolene, then lowering the pressure and speed of flow and simultaneously raising the temperature of the same by causing the vapors to impinge upon a baffle to effect a further amount of cracking.

11. A process of cracking an oil having higher boiling points than ordinary gasolene, which comprises passing said oil at a rate of flow sufficient to prevent deposition of any material amount of free carbon, through a pipe while under a pressure sufficient to prevent the conversion of excessive quantities of the oil into fixed gases, while at a temperature sufficient to vaporize said oil and to only partially crack the same into products having a boiling point range suitable for use as gasolene, then further raising the temperature of the vaporized and partially cracked oil, by causing the said vapors to enter a separate receptacle and to impinge against obstructions therein, and to thereby raise the temperature of the said vapors sufficient to further crack said vapors.

In testimony whereof I affix my signature.

WILLIAM AUGUSTUS HALL.